(12) United States Patent
Place

(10) Patent No.: US 6,296,018 B1
(45) Date of Patent: Oct. 2, 2001

(54) RACK AND PINION STEERING SYSTEM

(75) Inventor: Jack L. Place, Greeneville, TN (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/386,016

(22) Filed: Aug. 30, 1999

(51) Int. Cl.[7] ............................................. F15B 9/10
(52) U.S. Cl. ................................ 137/625.23; 91/375 A
(58) Field of Search .......................... 91/375 A, 375 R; 137/625.23, 625.22

(56) References Cited

U.S. PATENT DOCUMENTS

| | | | |
|---|---|---|---|
| 3,817,151 | * | 6/1974 | Kawabata et al. ................. 91/375 R |
| 4,378,030 | * | 3/1983 | Duffy .............................. 91/375 A X |
| 4,877,100 | * | 10/1989 | Emori et al. .................... 91/375 A X |
| 5,571,238 | * | 11/1996 | Breitweg et al. ................... 91/375 A |
| 5,593,166 | * | 1/1997 | Lovell et al. ........................... 277/59 |
| 5,851,006 | * | 12/1998 | Spillner et al. ................ 91/375 A X |
| 6,009,903 | * | 1/2000 | Rohringer et al. .............. 137/625.23 |

\* cited by examiner

*Primary Examiner*—John Rivell
*Assistant Examiner*—Meredith H. Schoenfeld
(74) *Attorney, Agent, or Firm*—Tarolli, Sundheim, Covell, Tummino & Szabo L.L.P.

(57) ABSTRACT

A fluid power assist rack and pinion steering gear assembly (10) includes a torsion bar (70) having a support portion (80) rotatable within an internal bore (60) of an input shaft (50). A circumferential groove (82) is located on the support portion (80) of the torsion bar (70). A compliant ring (90) in the groove (82) engages a cylindrical inner surface (56) in the input shaft (50) to enable rotation of the support portion (80) of the torsion bar (70) within the internal bore (60) of the input shaft while limiting relative radial movement between the support portion of the torsion bar and the input shaft. A hitch pin (100) has a first portion (106) disposed in a hitch pin opening (110) in the pinion (18) and a second portion (112) disposed in a hitch pin opening (116) in a valve sleeve (54). A portion (120, 122) of the material of the valve sleeve (54) is deformed into engagement with the hitch pin (100) to limit relative angular movement between the hitch pin and the valve sleeve about a primary axis (14) of the steering gear assembly (10).

11 Claims, 2 Drawing Sheets

RACK AND PINION STEERING SYSTEM

BACKGROUND OF THE INVENTION

1. Technical Field

The present invention relates to power assisted rack and pinion steering systems for vehicles. More specifically, the present invention relates to the connection between a pinion and a valve sleeve, and the connection between a torsion bar and an input shaft, in a fluid power assisted rack and pinion steering gear assembly.

2. Description of the Prior Art

In a typical fluid power assisted steering system for a vehicle, a rotary valve directs the flow of hydraulic fluid under pressure to a hydraulic motor. The motor moves steering linkage to effect turning of the steerable wheels of the vehicle. The rotary valve includes a valve core and a valve sleeve which are relatively rotatable. A steering input shaft extending from the vehicle steering hand wheel has a portion formed as the valve core. One end of a torsion bar is rotationally fixed to the input shaft. An output member is rotationally fixed to the valve sleeve. The other end of the torsion bar is rotationally fixed to the output member.

When there is a resistive load on the output member from the steerable vehicle wheels, steering torque transmitted through the input shaft causes the torsion bar to twist. This action actuates the valve from a neutral condition and changes the rotary position of the valve core relative to the valve sleeve, in turn changing the fluid flow through the valve and to the motor. The motor moves the steering linkage to turn the steerable vehicle wheels. Steering linkage movement moves the output member in a follow-up manner to rotate the valve sleeve relative to the valve core and return the rotary valve to its neutral condition.

In a fluid power assisted rack and pinion steering gear assembly, the pinion is the output member. One end of the torsion bar is press fitted to the pinion. The other end of the torsion bar is pinned to the input shaft by a drilling, reaming and pinning operation. One such rack and pinion steering gear is shown in U.S. Pat. No. 4,996,905. In such a steering gear assembly, the input shaft and the pinion are supported for rotation at only three places along their length. These parts unavoidably undergo small bending movements because of forces applied to the steering gear assembly.

One location where such movement is manifested is the location where the valve sleeve is connected for rotation with the pinion. Typically, a cylindrical hitch pin is press fitted in the pinion and extends through a cylindrical opening in the valve sleeve. The opening in the valve sleeve is slightly larger than the diameter of the hitch pin, because of manufacturing tolerances. This size difference allows for radial and axial movement of the hitch pin in the opening resulting from the above-mentioned bending of the parts. This size difference, however, undesirably allows some relative angular movement between the pinion and the valve sleeve.

Another location where such bending movement is manifested is the location where the inner end of the torsion bar rotates within the input shaft. Typically, the adjoining surfaces of these parts are closely fitted to limit relative radial movement of the parts while still allowing relative rotational movement. For example, in U.S. Pat. No. 4,996,905, a bearing surface on an inner end portion of the torsion bar supports a portion of the input shaft for rotation relative to the torsion bar. Machining the parts to close tolerances as needed to operate in this manner is difficult and expensive.

SUMMARY OF THE INVENTION

The present invention is a rack and pinion steering gear assembly comprising an input shaft having a cylindrical inner surface defining an internal bore in the input shaft, and a pinion coaxial with the input shaft. An axially extending torsion bar has a first end portion rotationally fixed to the input shaft, a second end portion rotationally fixed to the pinion, and a torsionally flexible portion disposed axially between the first and second end portions. A first valve member is rotatable with the input shaft. A second valve member is rotatable with the pinion and is disposed concentrically about the first valve member.

In one embodiment, a support portion of the torsion bar is rotatable within the internal bore of the input shaft and has a circumferential groove. A compliant ring is disposed in the groove on the support portion of the torsion bar. The ring engages the cylindrical inner surface in the input shaft to enable rotation of the support portion of the torsion bar within the internal bore of the input shaft while limiting relative radial movement between the support portion of the torsion bar and the input shaft.

In another embodiment, the second valve member and the pinion each have a hitch pin opening. A hitch pin has a first portion disposed in the hitch pin opening in the pinion and a second portion disposed in the hitch pin opening in the second valve member. A portion of the material of the second valve member is deformed into engagement with the second portion of the hitch pin to limit relative angular movement between the hitch pin and the second valve member about the primary axis of the steering gear assembly.

BRIEF DESCRIPTION OF THE DRAWINGS

Further features of the present invention will become apparent to those of ordinary skill in the art to which the present invention relates from reading the following description of a preferred embodiment with reference to the accompanying drawings, in which.

DESCRIPTION OF A PREFERRED EMBODIMENT

Figure 1:
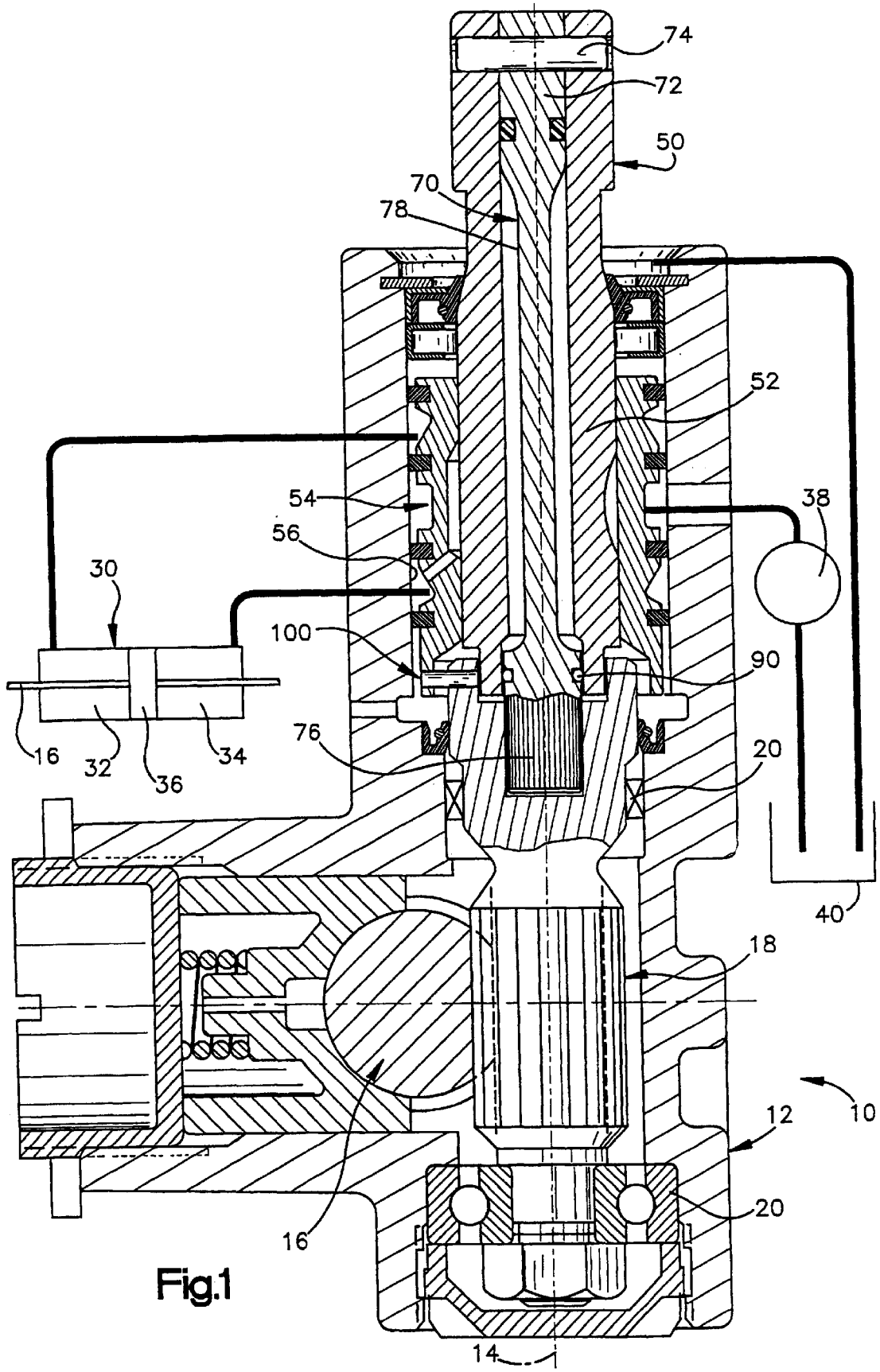
FIG. 1 is a sectional view of a portion of a fluid power assisted rack and pinion steering system in accordance with the present invention.

FIG. 1 illustrates a portion of a fluid power assisted vehicle steering system 8 which includes a rack and pinion steering gear assembly 10. The steering gear assembly 10 includes a housing 12 having a primary axis 14. Extending through the housing 12 is a rack bar. A pinion 18 is journalled in bearings 20 in the housing 12. The rack bar 16 is in toothed engagement with the pinion 18.

The steering gear assembly 10 includes a known hydraulic motor shown schematically at 30 having two chambers 32 and 34 on opposite sides of a piston 36. The piston 36 is fixed to the rack bar 16. The steering gear assembly 10, which includes a rotary valve, directs fluid under pressure from a pump 38, drawn from a reservoir 40, to the motor 30. The motor 30 moves the rack bar 16 linearly in a direction transverse to the primary axis 14, to effect steering of steerable wheels of the vehicle. Linear a displacement of the rack bar 16 also rotates the pinion 18, in a known follow-up manner, to return the rotary valve to a neutral condition.

A steering input shaft 50, which is rotatable with the vehicle steering wheel (not shown), extends into the housing 12 and forms an inner valve member or valve core 52 of the rotary valve. The valve core 52 may alternatively be an element separate from the input shaft 50, but in any event is rotatable with the input shaft 50. The valve core 52 is located within an outer valve member or valve sleeve 54 rotatable within a bore 56 of the housing 12.

Figure 2:
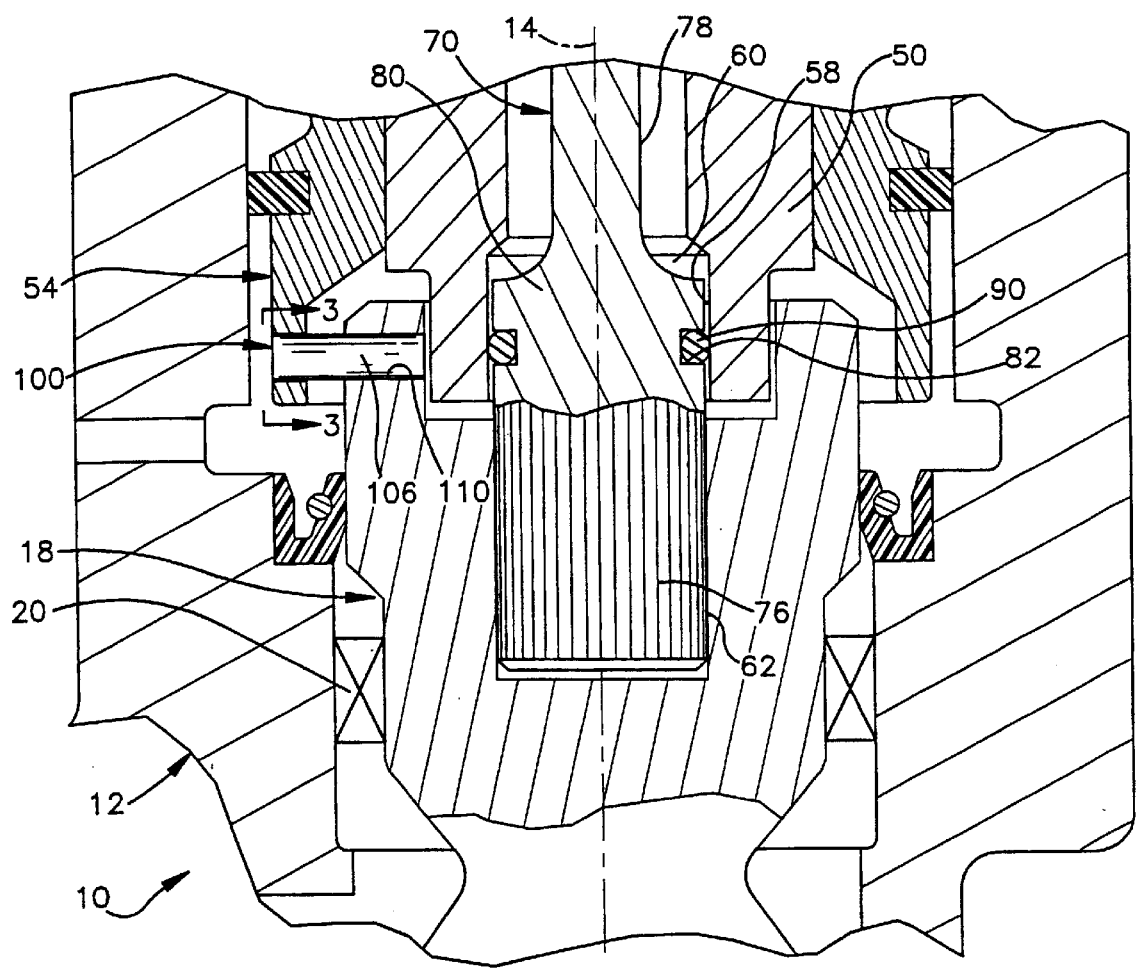
FIG. 2 is an enlarged view of a portion of the steering system of FIG. 1.

The input shaft 50 has a cylindrical inner surface 58 (FIG. 2) defining a cylindrical internal bore 60 in the input shaft. The cylindrical surface 58 is centered on the primary axis 14. The bore 60 in the input shaft 50 is axially aligned with a bore 62 in the end of the pinion 18.

A torsion bar 70 extends axially through the bore 60 in the input shaft 50 and into the bore 62 in the pinion 18. An outer end portion 72 (FIG. 1) of the torsion bar 70 is pinned to the input shaft 50 with a pin 74. As a result, the outer end portion 72 of the torsion bar 70 is fixed for rotation with the input shaft 50 about the primary axis 14.

A splined inner end portion 76 (FIG. 2) of the torsion bar 70 is press fitted in the bore 62 in the pinion 18. As a result, the inner end portion 76 of the torsion bar 70 is fixed for rotation with the pinion 18 about the primary axis 14. A torsionally flexible portion 78 of the torsion bar 70 interconnects the inner and outer end portions 72 and 76 of the torsion bar.

A cylindrical support portion 80 of the torsion bar 70 is disposed in the internal bore 60 of the input shaft 50. The outer diameter of the support portion 80 of the torsion bar 70 is significantly less than the inner diameter of the bore 60 of the input shaft 50. As a result, there is a radial clearance between the support portion 80 of the torsion bar 70 and the input shaft 50.

A groove 82 extends circumferentially around the support portion 80 of the torsion bar 70. The groove 82 has a generally rectangular configuration when viewed in radial cross-section as in FIG. 2.

A compliant ring 90, of the type commonly referred to as an "O-ring", is positioned in the groove 80 in the torsion bar 70. The ring 90 takes up the radial clearance between the torsion bar 70 and the input shaft 50. The ring 90 engages the cylindrical inner surface 58 defining the internal bore 60 in the input shaft 50. A preferred material for the ring is carbon filled PTFE (polytetrafluoroethylene).

Figures 3, 4:
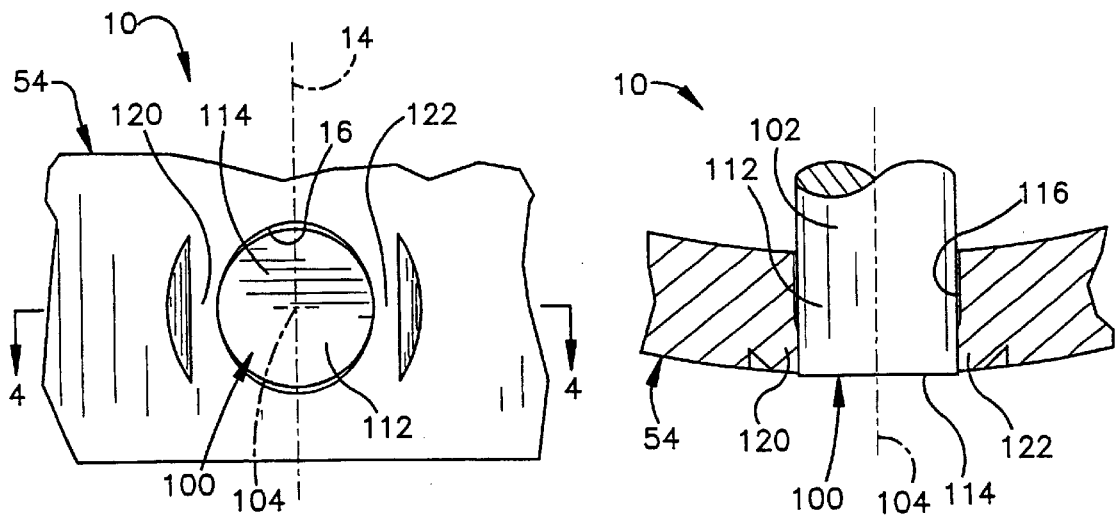
FIG. 3 is a sectional view taken generally along the line 3—3 of FIG. 2.
FIG. 4 is a plan view taken generally along the line 4—4 of FIG. 3.

The valve sleeve 54 is rotationally fixed to the pinion 18 by a hitch pin 100. The hitch pin 100 has a cylindrical configuration including a cylindrical outer side surface 102 (FIG. 4) extending parallel to a longitudinal central axis 104 of the hitch pin. The hitch pin 100 has an inner end portion 106 (FIG. 2) press fit in a cylindrical hitch pin opening 110 in the pinion 18. An outer end portion 112 (FIG. 3) of the hitch pin 100 includes a circular outer end surface 114 of the hitch pin. The outer end portion 112 of the hitch pin 100 is received in a circular hitch pin opening 116 in the valve sleeve 54.

The hitch pin opening 116 in the valve sleeve 54 is slightly larger in diameter than the hitch pin 100 itself, because of the manufacturing tolerances needed for assembling the steering gear 10. This size difference permits a slight amount of relative movement between the hitch pin 100 and the valve sleeve 54, in three directions: along the axis 104 of the hitch pin, along the primary axis 14 of the steering gear assembly 10, and angularly (circumferentially about the primary axis of the steering gear assembly).

Two portions 120 and 122 of the material of the valve sleeve 54 surrounding the hitch pin opening 116 are deformed inwardly into engagement with the outer end portion 112 of the hitch pin 100. The two material portions 120 and 122 are diametrically opposite each other about the axis 104 of the hitch pin 100. The two material portions 120 and 122 are located angularly around the circumference of the hitch pin 100, at 90 degrees on either side of the primary axis 14 when viewed as in FIG. 4.

The deformation of the material of the valve sleeve 54 blocks relative angular movement between the hitch pin 100 and the valve sleeve (about the primary axis 14 of the steering gear assembly 10). The deformation of the material of the valve sleeve 54 does not block relative movement between the hitch pin 100 and the valve sleeve in a direction along the axis 104 of the hitch pin or in a direction along the primary axis 14 of the steering gear assembly 10.

The operation of the steering gear assembly 10, as to fluid flow therethrough, is conventional. Hydraulic fluid under pressure from the pump 38 continuously enters the steering gear assembly 10. A rotational steering input on the input shaft 50, against a load on the pinion 18, causes the torsion bar 70 to twist along its torsionally flexible portion 78. The valve core 52 is rotated relative to the valve sleeve 54.

The relative angular displacement of the valve core 52 and the valve sleeve 54 directs fluid under pressure to one or the other of the motor chambers, for example, the motor chamber 32, increasing the pressure in that motor chamber. At the same time, the relative angular displacement of the valve core 52 and the valve sleeve 54 provides a more open path for passage of fluid out of the other motor chamber, thus decreasing the pressure in that motor chamber. The increase in pressure in the one motor chamber, combined with the decrease in pressure in the other motor chamber, moves the piston 36, thus moving the rack bar 14 linearly and effecting steering movement.

The ring 90 limits relative radial movement between the input shaft 50 and the support portion 80 of the torsion bar 70. As a result, the torsion bar 70, which is pinned to the pinion 18 and thus supported by the bearing 20, helps to support the input shaft 50. This can limit bending movements within the steering gear assembly 10 and make the operation of the steering gear assembly more predictable and repeatable. At the same time, because the ring 90 is compliant, the support portion 80 of the torsion bar 70 is relatively rotatable within the input shaft 50, as is needed for proper operation of the steering gear assembly 10.

The detrimental effects of bending movements within the steering gear assembly 10 are also minimized by the deformation of the material of the valve sleeve 54 around the outer end portion 112 of the hitch pin 100. This deformation blocks relative angular movement between the hitch pin 100 and the valve sleeve 54 (about the primary axis 18 of the steering gear assembly 10). This limits relative rotation between the pinion 18 and the valve sleeve 54, thus helping to ensure that the pinion and the valve sleeve rotate together as is desired.

From the above description of the invention, those skilled in the art will perceive improvements, changes and modifications in the invention. Such improvements, changes and modifications within the skill of the art are intended to be covered by the appended claims.

Having described the invention, I claim:

1. A rack and pinion steering gear assembly comprising:
   an input shaft having a cylindrical inner surface defining an internal bore in said input shaft;
   a pinion coaxial with said input shaft;
   an axially extending torsion bar having a first end portion rotationally fixed to said input shaft, a second end portion rotationally fixed to said pinion, and a torsionally flexible portion disposed axially between said first and second end portions;

a first valve member rotatable with said input shaft;

a second valve member rotatable with said pinion and disposed concentrically about said first valve member;

said torsion bar having a support portion rotatable within said internal bore of said input shaft and having a circumferential groove on said support portion of said torsion bar; and a compliant ring disposed in said groove on said support portion of said torsion bar and engaging said cylindrical inner surface in said input shaft to enable rotation of said support portion of said torsion bar within said internal bore of said input shaft while limiting relative radial movement between said support portion of said torsion bar and said input shaft.

2. An assembly as defined in claim 1 wherein said ring is made from carbon filled PTFE.

3. An assembly as defined in claim 1 wherein said support portion of said torsion bar supports a portion of said first valve member for rotation relative to said torsion bar.

4. A rack and pinion steering gear assembly comprising:

an input shaft having an axis coaxial with a primary axis of said steering gear assembly;

a pinion coaxial with said input shaft, said pinion having a hitch pin opening;

an axially extending torsion bar having a first end portion rotationally fixed to said input shaft, a second end portion rotationally fixed to said pinion, and a torsionally flexible portion disposed axially between said first and second end portions;

a first valve member rotatable with said input shaft;

a second valve member disposed concentrically about said first valve member, said second valve member having a hitch pin opening; and a hitch pin having a first portion disposed in said hitch pin opening in said pinion and having a second portion disposed in said hitch pin opening in said second valve member;

a portion of the material of said second valve member being deformed into engagement with said second portion of said hitch pin to limit relative angular movement between said hitch pin and said second valve member about said primary axis of said steering gear assembly.

5. An assembly as set forth in claim 4 wherein said deformed material portion comprises first and second spaced areas of the material of said second valve member.

6. An assembly as set forth in claim 5 wherein said first and second spaced areas of the material of said second valve member are spaced apart diametrically about an axis of said hitch pin.

7. An assembly as set forth in claim 6 wherein said first and second spaced areas of the material of said second valve member are spaced apart angularly about said primary axis of said steering gear assembly.

8. An assembly as set forth in claim 4 wherein said torsion bar has a support portion rotatable within said internal bore of said input shaft and has a circumferential groove on said support portion of said torsion bar, and further comprising a compliant ring disposed in said groove on said support portion of said torsion bar and engaging a cylindrical inner surface in said input shaft to enable rotation of said support portion of said torsion bar within said input shaft while limiting relative radial movement between said support portion of said torsion bar and said input shaft.

9. A rack and pinion steering gear assembly comprising:

an input shaft having a cylindrical inner surface defining an internal bore in said input shaft;

a pinion coaxial with said input shaft;

an axially extending torsion bar having a first end portion rotationally fixed to said input shaft, a second end portion rotationally fixed to said pinion, and a torsionally flexible portion disposed axially between said first and second end portions;

a first valve member rotatable with said input shaft;

a second valve member rotatable with said pinion and disposed concentrically about said first valve member;

said torsion bar having a support portion rotatable within said internal bore of said input shaft and having a circumferential groove on said support portion of said torsion bar, said support portion of said torsion bar being movable with an end portion of said torsion bar press fitted in said pinion; and a compliant ring disposed in said groove on said support portion of said torsion bar and engaging said cylindrical inner surface in said input shaft to enable rotation of said support portion of said torsion bar within said internal bore of said input shaft while limiting relative radial movement between said support portion of said torsion bar and said input shaft.

10. An assembly as defined in claim 9 wherein said ring is made from carbon filled PTFE.

11. A rack and pinion steering gear assembly comprising:

an input shaft having a cylindrical inner surface defining an internal bore in said input shaft;

a pinion coaxial with said input shaft;

an axially extending torsion bar having a first end portion rotationally fixed to said input shaft, a second end portion rotationally fixed to said pinion, and a torsionally flexible portion disposed axially between said first and second end portions;

a first valve member rotatable with said input shaft;

a second valve member rotatable with said pinion and disposed concentrically about said first valve member;

said torsion bar having a support portion rotatable within said internal bore of said input shaft and having a circumferential groove on said support portion of said torsion bar;

a compliant ring disposed in said groove on said support portion of said torsion bar and engaging said cylindrical inner surface in said input shaft to enable rotation of said support portion of said torsion bar within said internal bore of said input shaft while limiting relative radial movement between said support portion of said torsion bar and said input shaft; and a hitch pin having a first portion in said pinion and having a second portion disposed in a hitch pin opening in said second valve member, a portion of the material of said second valve member being deformed into engagement with said second portion of said hitch pin to limit relative angular movement between said hitch pin and said second valve member about said primary axis of said steering gear assembly.

* * * * *